May 23, 1939.　　　　F. R. HOUSE　　　　2,159,482
SYSTEM OF LOCATING AIRCRAFT AT NIGHT
Filed July 19, 1934　　　5 Sheets-Sheet 5

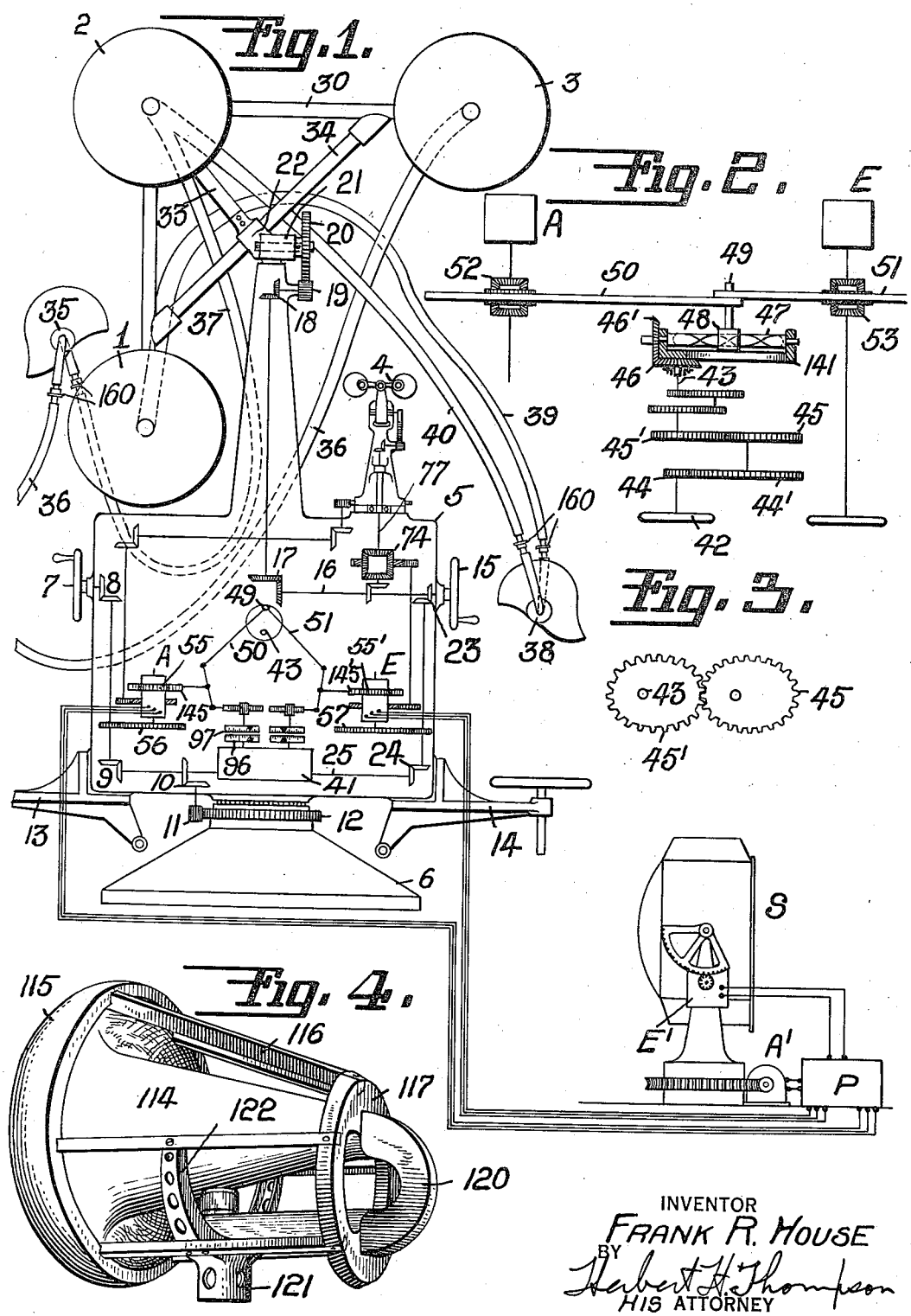

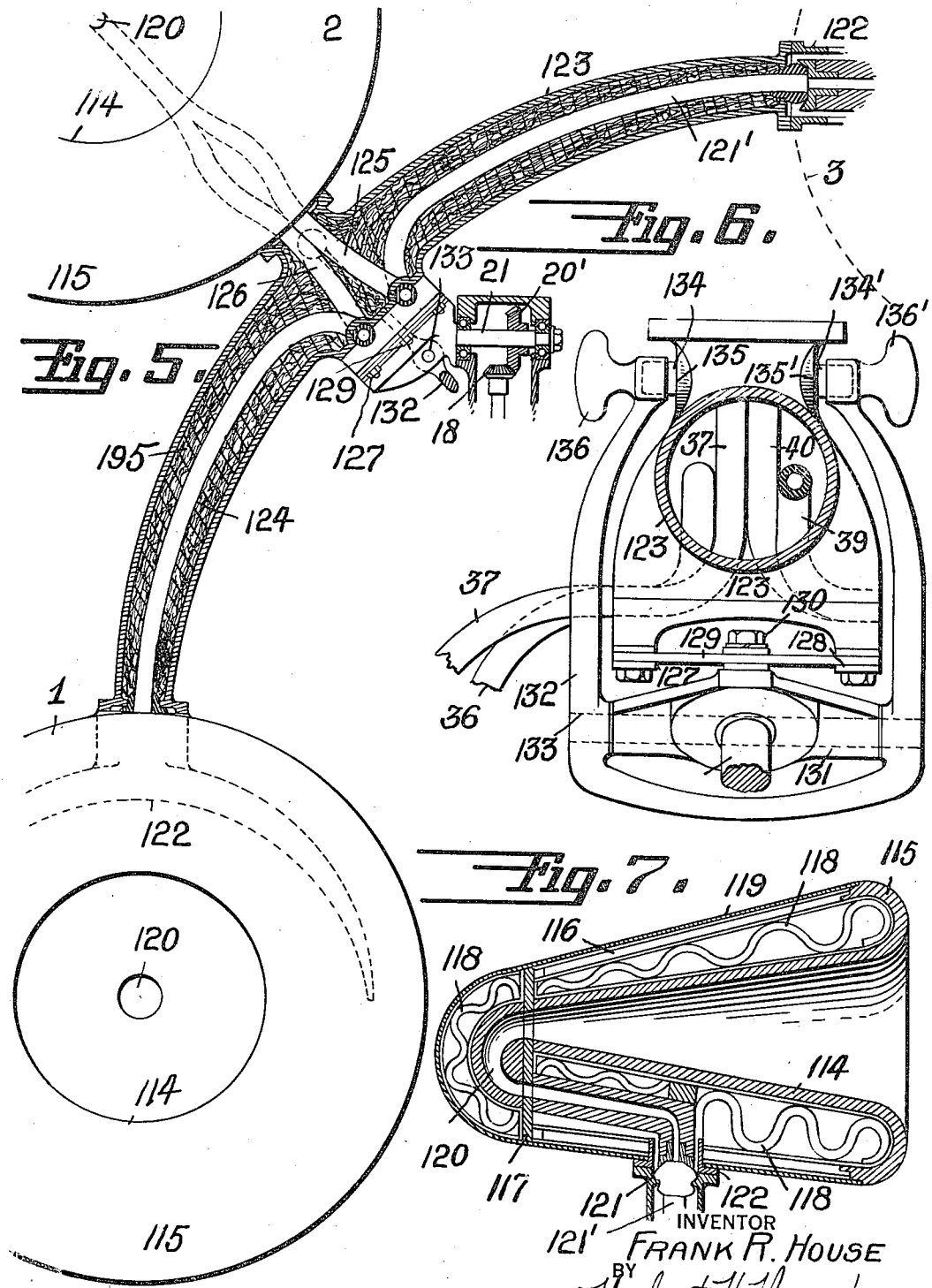

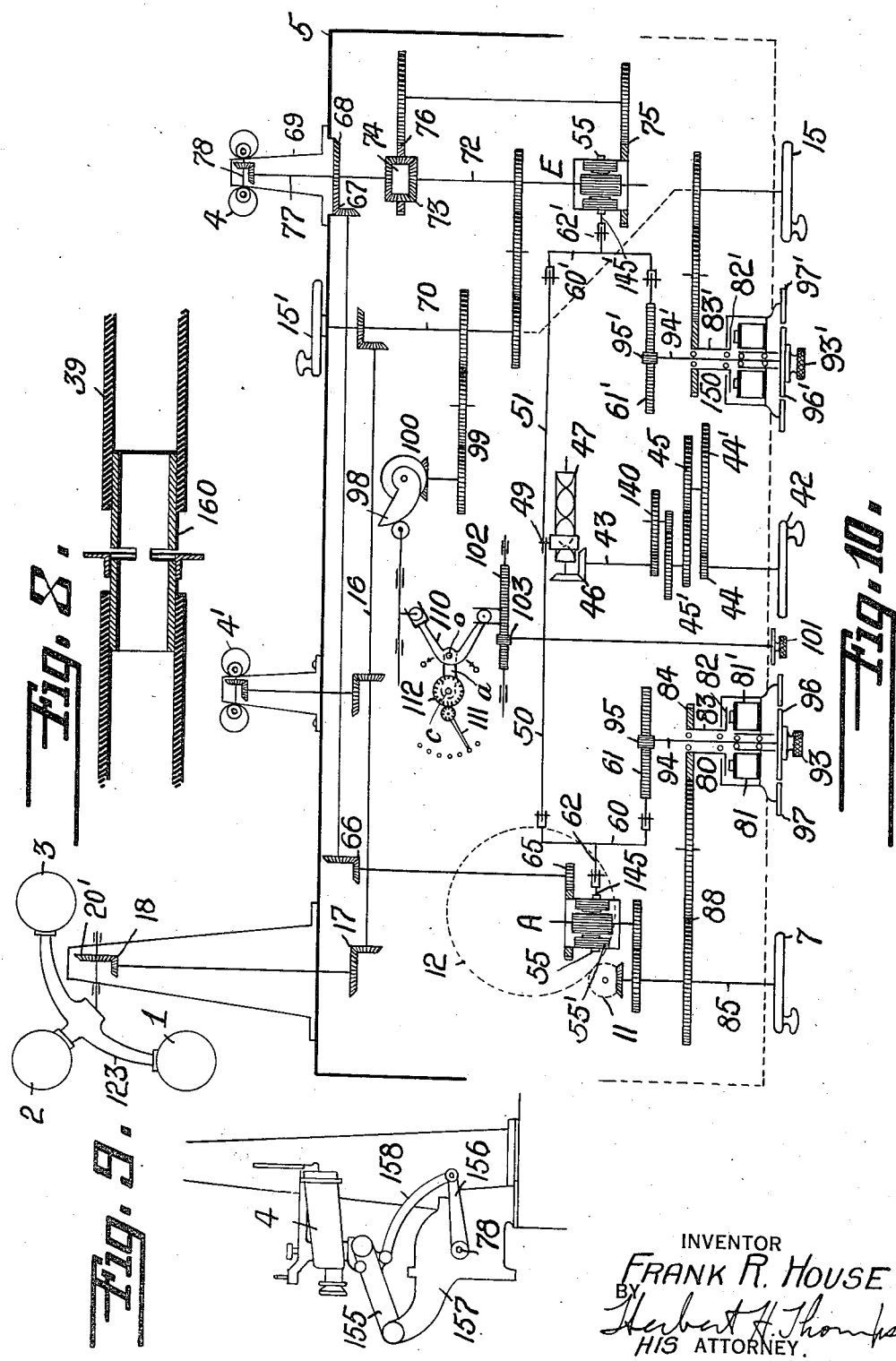

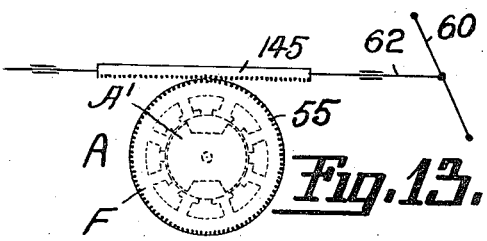
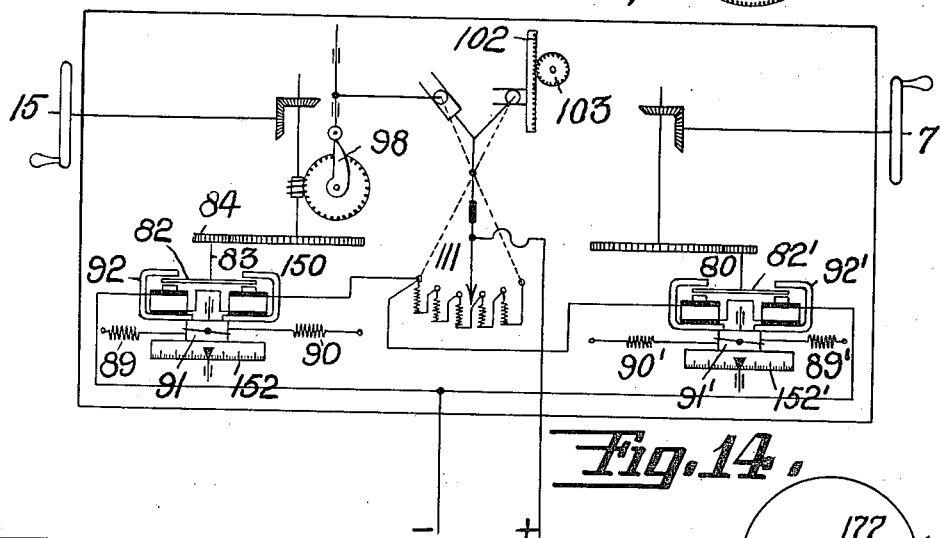
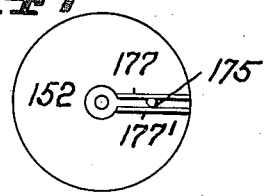
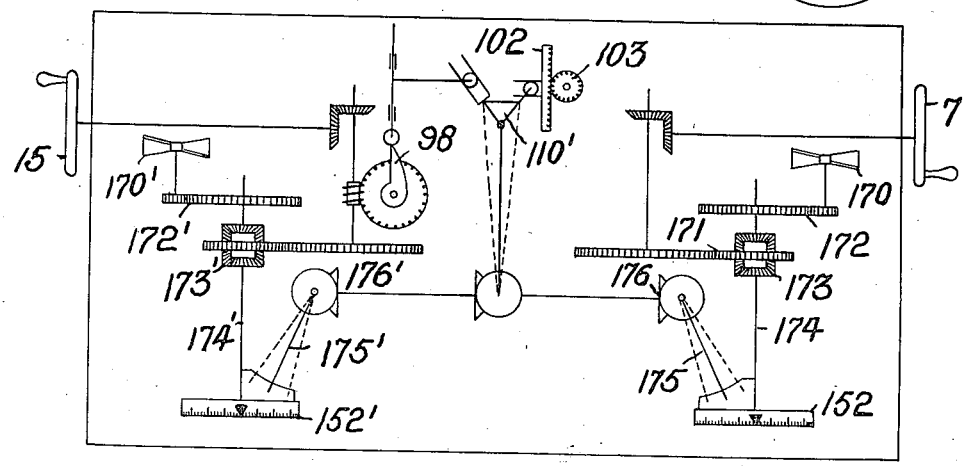

INVENTOR
FRANK R. HOUSE
BY
HIS ATTORNEY

Patented May 23, 1939

2,159,482

UNITED STATES PATENT OFFICE 2,159,482

SYSTEM OF LOCATING AIRCRAFT AT NIGHT

Frank R. House, Baldwin Harbor, N. Y., assignor to Sperry Gyroscope Company, Inc., Brooklyn, N. Y., a corporation of New York Application July 19, 1934, Serial No. 735,989

12 Claims. (Cl. 240—1.2)

This invention relates to apparatus for locating air-craft or other moving targets at night by means of a sound locator or other non-optical device for initially positioning a searchlight, together with the correction devices employed in connection therewith to compensate for the sound lag and other errors. According to the present invention the construction of the binaural sound locator horns is improved and simplified and the system as a whole is simplified by eliminating the third station, known as the comparator station, heretofore employed in the system. According to my present invention the searchlight predicated position is transmitted directly from the correction device in the base of the sound locator, and the binoculars for observing the searchlight beam are also placed at the sound locator, the searchlight control being effected by the binoculars as soon as the target is picked up. A further improvement effected by my invention is improved means for determining the rate of movement of the sound locator, which factor is used in the computing mechanism.

Referring to the drawings illustrating several forms my invention may assume,

Fig. 1 is an elevation in outline form of a combined sound locator, corrector and binocular, together with the search-light operated therefrom.

Fig. 2 is a detail of one form of the scanning or searching mechanism employed in connection therewith.

Fig. 3 is a detail of the elliptical gears employed in said mechanism.

Fig. 4 is a perspective view of one of the sound locator horns before the final covering of sound absorbing material has been applied thereto.

Fig. 5 is a front view, partly in section, of the sound locator horns and supporting mechanism, showing a slightly modified construction.

Fig. 6 is a detail of the mounting thereof.

Fig. 7 is a vertical section through one of the horns.

Fig. 8 is a sectional detail of one of the sound filters preferably employed in the sound track between the horn and the helmet.

Fig. 9 is a side elevation, on a larger scale, of one of the binoculars.

Fig. 10 is a skeleton diagram of the interior of the corrector and transmitting mechanism of a slightly modified form.

Fig. 11 is a diagram showing the rate computing mechanism of Fig. 10 in greater detail.

Fig. 12 is a similar diagram of a modified form of rate computing mechanism.

Fig. 13 is a detail of one of the self-synchronous transmitters, showing the rotatable field and armature.

Fig. 14 is a rear elevation of the indicator disc in Fig. 12.

Figure 15:
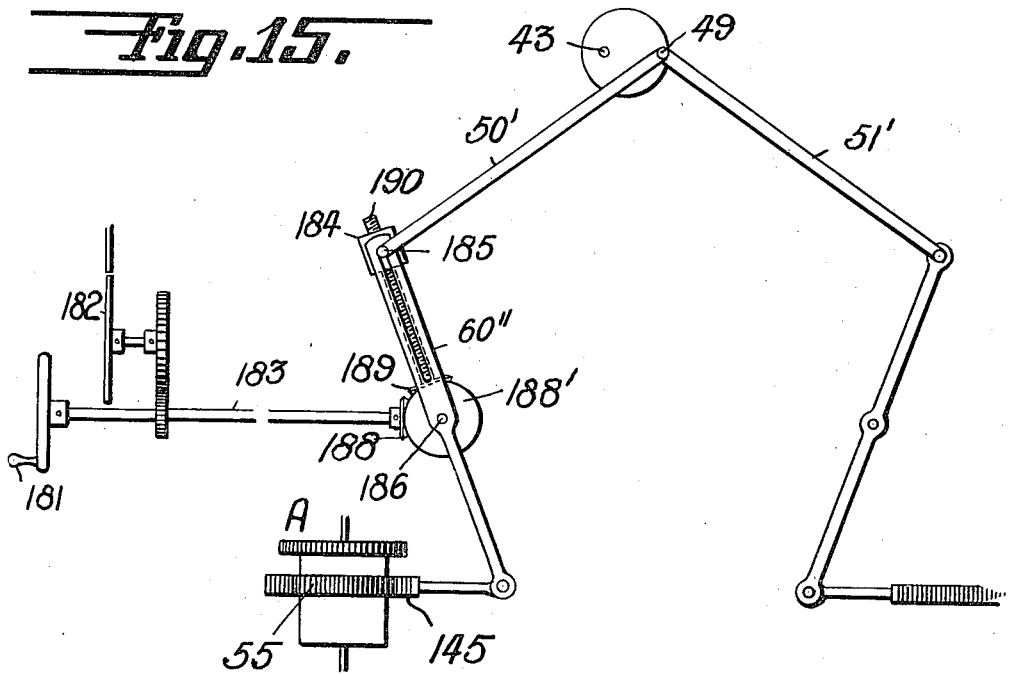
Fig. 15 is a diagram showing a modified method of scanning control.
Figure 16:
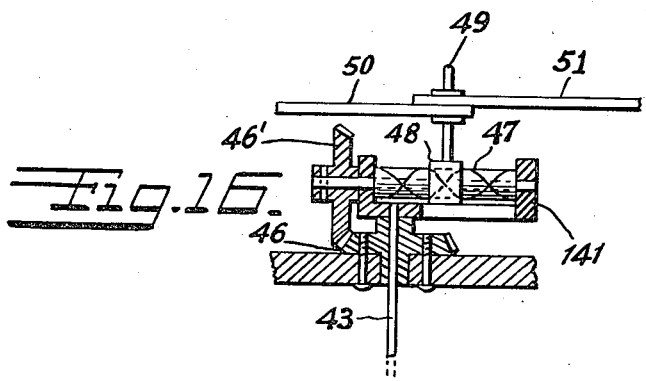
Fig. 16 is a detail of a portion of the scanning operating device.

According to my invention, the sound locator comprises a suitable arrangement of listening or sound collecting horns 1, 2 and 3, mounted for both turning in azimuth and tilting in elevation, as shown in Figs. 1 or 5. By employing only three instead of four horns, as heretofore proposed, a saving in weight is effected and room is secured for the placing of binoculars 4 on the box 5 at the base of the instrument. The entire box is preferably rotatably mounted on the pedestal 6 and is shown as rotated from the azimuth handwheel 7 through gearing 8, 9 and 10 and through pinion 11, mounted on said box and meshing with the large gear 12 fixed to the pedestal 6. The rotation of said handwheel will therefore rotate the horns in azimuth and at the same time rotate the binoculars 4, and carry the observers seated on extensions 13 and 14 with the horns.

The elevational control is shown as effected through a handwheel 15, which is shown as mounted on the shaft 16 to turn gears 17 and 18, which in turn revolve the pinion 19 meshing with gear 20. The latter is mounted on a cross shaft 21 (Fig. 5) which has secured thereto a 45° bracket 22, so that when said bracket is turned with shaft 21 it moves the horn system in elevation.

The horn system itself is shown in this figure as supported on a triangular framework 30 and there is provided a flat spring 33 connecting the apex of the triangle and the bracket 22, so that the horn system may oscillate about the axis of the rod 34 to increase the field of hearing and sensitivity of the device. In other words, by giving the horns a vibratory motion in both azimuth and elevation the keenness of perception of the operators is increased by giving them a continuous comparison of the intensity of the sound being received. The helmet or ear 'phones 35 are connected by separate sound tracks 36 and 37 to the azimuth horn 3 and the common horn 2, while the elevation ear 'phones 38 are similarly connected by separate sound tracks 39 and 40 to the elevation horn 1 and the common horn 2. Hence the horn 2 serves for both elevation and azimuth comparisons.

In Fig. 1 the correction mechanism is not shown, but is represented as enclosed within the box 41.

As explained in the copending application of Preston R. Bassett and applicant, now Patent #2,003,661 dated June 4, 1935, for Searchlight directors, in order to pick up the target quickly I provide a means for causing the searchlight beam to search a predetermined path around the region indicated by the sound locator. For this purpose there is shown the scanning handwheel 42 (Figs. 2 and 10), which is shown as turning a shaft 43 through pinion 44, gear 44', a pair of elliptical gears 45 and 45', and a step up gear train 140, the latter driving the shaft 43. Said shaft 43 has secured thereto a bracket 141 having bearings thereon rotatably mounting a cylinder 47 which has large pitch reverse spirals cut therein so as to cause the nut 48 to travel back and forth along the length of said cylinder as it is turned on its own axis by bevel gear 46' meshing with a stationary bevel 46. Said nut is shown as having a pin 49 engaging a pair of 90° bars or links 50 and 51 which operate parts of differential arrangements for superimposing the two components of the spiral motion of pin 49 upon the elevation and azimuth motions normally imparted from the handwheels 7 and 15.

Said handwheels effect the primary movement of the transmitters A and E for transmitting the corrected azimuth and elevation of the sound locator to the searchlight. The scanning motion may be introduced through mechanical differentials 52 and 53, as shown in Fig. 2, but the differential action may be effected in a similar manner by turning the armatures of the motors (for example) from the motions of the respective handwheels and turning the other parts, i. e., the field F of the motors around the armatures from the scanning and correction mechanisms. This form of differential is shown in Figs. 1, 10 and 13, in which the framework of the field of each motor is provided with gear teeth 55 which mesh with the proper rack bar 145 or 145'. The armature A' of said motors is turned from the respective handwheels through suitable gearing 56 and 57.

The purpose of the elliptical gears 45, 45' in the scanning control is to maintain the linear rate of movement of the searchlight beam substantially constant regardless of the radius of the spiral at any particular point. If ordinary gearing were employed, it is obvious that the angular rate of the beam would remain constant, but that the beam would travel linearly much more slowly when the spiral was near the center than when it was near the end. This would result in either unnecessarily slow movement near the center or dangerously fast movement near the end, but by using elliptical gearing or the equivalent, the linear rate of movement may be kept substantially constant.

The sound lag and other corrections are also put in by shifting the fields of said transmitters through a second suitable differential arrangement. As shown in Figs. 1 and 10, the scanning link 50 is connected to one side of a lever 60, the other end being connected to the rack bar 61 operated from the azimuth correction device 80. An intermediate point of said link is then connected to turn the field of said motor, as by linkage arrangement 62, as shown in Fig. 10, and by rack 145 or similar means (Fig. 1). A like arrangement is provided to introduce the elevation correction from elevation corrector 150.

Transmitters A and E control the position of the searchlight S by actuating azimuth and elevation motors A' and E' through suitable power multiplier P.

Since the binoculars 4 are mounted on the box 5, they turn in azimuth with the box upon the rotation of the handwheel 7. The correction and scanning devices, however, do not move the box 5, but should operate the binoculars so as to maintain the same directed at the same point in the heavens at which the searchlight is directed. To this end the field 55' of the azimuth transmitter A is geared through suitable gearing 65, 66 and 67 to a gear 68 on the base of the rotatably mounted column 69 supporting the binoculars 4, so that the scanning motion and correction are imparted to the binoculars in azimuth.

In elevation, all of the primary, correction and scanning motions are imparted directly to the binoculars. To this end, the shaft 72 of the elevation transmitter E, which is turned from cross shaft 70 of elevation handles 15 and 15', is also provided with a gear 73 forming one arm of a differential gear train 74. Another arm of said train is turned by gearing 75, 76 from the field of said elevation transmitter, into which the elevation correction and elevation scanning motions are introduced through the linkage 51, 60' and 62', similar to the corresponding linkage in azimuth. The third arm of said train is connected by shaft 77 to a shaft 78 which turns the binoculars in elevation.

The sound lag correction in azimuth and elevation is preferably computed from suitable rate devices 80 and 150 which measure the average rate of movement of the sound locator in azimuth and in elevation and with which is combined a function of the time taken for sound to travel from the target to the sound locator. A simple mechanism for accomplishing this purpose comprises one or more electromagnets 81, 81', above which is rotatably mounted a metal disc 82, shown as secured to sleeve or shaft 83, carrying a gear 84 so as to be driven from the shaft 85 of the handwheel 7 through suitable gearing 88. Said electromagnets are mounted on a revoluble framework, the rotation of which in either direction is opposed by a pair of springs 89, 90 which are reversely wound around a drum 91 secured to the rotatable framework 92 supporting said electromagnets (Figs. 10 and 11). Said electromagnets will therefore be dragged around in the direction of movement of the disc 82 through an angle proportional to the rate of movement of said disc, thereby moving an indicator 152 through an angle representing the rate of movement of the sound locator. This rate may be used to set the rack bar 61 or equivalent linkage either automatically or by hand. The latter method is shown in Figs. 1 and 10, the operator setting the knob 93 on the shaft 94 of the pinion 95 so that the index on the dial 96 thereon matches the index on the dial 97 on the framework of the magnets 81, 81'.

The slant range factor is introduced, according to my invention, in a very simple manner by means of an angle of elevation cam 98 set from the elevation angle handwheel 15 through suitable gearing 99 and 100 and from a height setting introduced from thumb piece 101 which moves rack bar 102 through pinion 103, the height being estimated by the operator from his knowledge of the type of attacking plane, weather conditions, etc. The height H and elevation angle $\theta$ constitute a leg and opposite angle of a right triangle, of which the hypothenuse is the slant range (SR) or, in other words, $$\sin \theta = \frac{H}{SR}, \text{ or } SR = \frac{H}{\sin \theta}$$

This equation may be solved by a bell crank lever 110 pivoted at $o$ on an arm $a$ which, in turn, is pivoted at $c$. One arm of said lever 110 is positioned from the cam 98 and the other arm from the rack bar 102 through suitable roller and trackway connections. The consequent rotation of said lever and arm about center $c$ is a function of the slant range and turns a rheostat arm 111 through gear 112 secured to arm $a$. The movement of said arm varies the current flowing through the electromagnets 81, 81' so that the indicator is moved as a function of both the slant range, or time lag of sound, and the rate to introduce the sound lag correction. Fig. 11 shows said rheostat as operating both azimuth and elevation rate devices 80 and 150.

It will be understood that suitable parallax corrections in azimuth and elevation are introduced, although not illustrated in this application.

Preferably I employ an additional binocular 4' at the sound locator, into which neither the scanning nor correction movements are introduced. This binocular has a wide field of vision and is at all times directed at the same point that the sound locator is pointed. The second binocular is of especial importance in case several searchlights and sound locators are operating conjointly. In such case, if one of the searchlights picks up a target there is no object in having the other searchlights directed at the same target, and the enemy may consist of several planes flying in formation. Therefore it becomes highly desirable to pick up any other planes in the vicinity of the sighted plane. To this end, one of the sound locator operators temporarily suspends the use of the sound locator and maintains the device on the target by observing through the extra binoculars 4'. The scanning operator then turns the handwheel 62 as before, so as to systematically search the region around the located plane. If an additional plane is sighted by either operator, the scanning control is eliminated and either pair of binoculars kept on the target. This will transmit the true bearings to the searchlight.

The binoculars are preferably mounted as shown in Fig. 9, to tilt in elevation. For this purpose there are shown two parallel links 155 and 156 pivoted on the base 157 and connected by a cross link 158. The binoculars proper are fixed to the upper link 155 so that when the linkage is revolved or oscillated in a counter-clockwise direction (Fig. 9), the binoculars are tilted upwardly. The tilting movement of the binoculars is governed by the shaft 78, which may be turned in any suitable manner, such as illustrated in Fig. 10.

The preferred form of sound locator horn and mounting therefor are shown in Figs. 2, 4, 5 and 7. The sound tracks from horn 2 are not shown, but it will be understood that they are preferably of the same length as the sound tracks from the other two horns, as indicated in Fig. 1. In this construction the horn itself is made smaller than the usual exponential horn and is carefully stream-lined and sound-proofed to avoid transmitting extraneous sounds to the ear of the observer. As shown in Figs. 4 and 7, the horn is built up with conical shaped interior 114, preferably made of wood and having a rounded or bell mouth 115. On the outside of said horn 114 are placed stiffening ribs 116, connecting the bell mouth 115 with a re-enforcing ring 117 at the rear thereof. In between said mouth and ring there is placed corrugated sound absorbing material 118, such as glass wool, and the whole is covered by exterior covering 119 so that a smooth stream lined exterior is presented to the wind which does not set up any wind noises and which also tends to exclude noises coming from the side. Preferably the sound track 120 leading from the apex of the horn is kept within the exterior of the horn until it emerges into the tube 121, by which the sound is carried to the listener. The horn is shown as supported in a U-shaped bracket 122 (Fig. 4) which is secured at its base to a curved frame 123 which supports the three horns and also preferably encloses the sound transmitting tubing 121', 124, 125 and 126 until said tubes emerge near the pivotal point of the system (see Figs. 5 and 6). In these figures the framework 123 is bolted at spaced points 127, 128 to a resilient plate 129, which is shown as bolted at a spaced point or points 130 to the main support 131. Therefore the horn structure is free to oscillate in both azimuth and elevation through a limited angle for the same purpose as effected by the spring 33 in Fig. 1. If desired, however, the structure may be locked to prevent this oscillation by means of a U-shaped bracket 132 pivoted on shaft 133 and having friction faces 134 and 134' adapted to bear against flattened surfaces 135 and 135' on the horn structure. When in the position shown in Fig. 6, no oscillation can occur, but in case oscillation is desired, the handles 136 and 136' are grasped by the operator and the framework swung downwardly to release the horn framework from locking engagement with the surfaces 134 and 134'.

In order to exclude extraneous sounds from the binaural system, I find it very important to employ sound filters 160 between the horns and the helmets. (Figs. 1 and 8.) Such filters are adjusted to filter out sounds of different pitch from the normal pitch of the propeller and engine drone from aircraft. With these devices the operator is not confused to such a great extent by extraneous noises. Sound absorbing material 195 is also placed between tubing 121', 124, etc., and frame 123.

In Fig. 12 is shown a modified method of ascertaining the rate of movement of the target and of computing the sound lag error therefrom. According to this system I drive from each of the azimuth and elevation handwheels an air paddle or fan 170, 170' at fairly high speed through step-up gearing 171, 172 and differential 173, the handwheels driving one arm of the differential and the air paddles connected to another arm. The third arm of said differential is connected to a shaft 174 so that a torque is exerted on said shaft proportional to the speed of the fan 170. The turning of the shaft 174 is yieldingly opposed by a flat spring 175, the radial position of which is controlled by gear 176, to the hub of which said spring is secured. Said gear is positioned from the time computing mechanism 110', similar to that shown in Figs. 10 and 11, so that the force exerted by this spring opposing rotation depends on the position of the end of said spring between the walls 177 and 177' formed on the rear face of the indicating disc 152 (Fig. 14).

Investigation of the scanning control hereinbefore described will show that the azimuthal and elevation axes of the spirals are only equal when the beam is horizontal and that the azimuth axis will decrease substantially as the cosine of the angle of elevation until at 90° it will disappear and the scanning action will be in a straight line. This defect is not serious, however, since a substantial azimuth movement is obtained up to 60° elevation and more, and the target is usually picked up below that elevation. However, to improve the scanning at high angles the modification illustrated in Fig. 15 may be resorted to. According to this modification, the angle bar 50', which introduces the azimuth scanning motion, may be slidably connected to a slotted lever 60" and means may be provided for sliding said connection radially along the lever in accordance with a function of the angular elevation. To this end a setting handle 181 may be provided, which is turned so that a dial 182 indicates the proper elevation angle. The dial is marked in values of elevation to set the correct cosine correction into the mechanism, and the shaft 183 of the handle 181 is shown as driving bevel gears 188 and 188', which mesh with a third bevel 189, the shaft 190 of which is threaded into a nut 184. On said nut is a pivot pin 185 slidable in the slot in lever 60". As the angle of elevation is increased, the pivot pin 185 is moved closer to the center of the lever so as to give it a larger angular movement.

The physical operation of my sound locator system is as follows: In the embodiment shown, four operators are used, of which one is the listener at helmet 35, another the listener at helmet 38. Another is an operator who introduces the sound lag corrections by turning knobs 93 and 93' to match pointers 96 and 97 and 96' and 97'. The fourth operator is the observer through the binoculars 4, who also operates the scanning handwheel 42. As soon as the target is sighted, however, the binocular observer takes over the operation of the azimuth and elevation handwheels 7 and 15 from the listeners and discontinues using the scanning handwheel 42. At the same time the other operator discontinues operating knobs 93 and 93', which at once discontinues the introduction of sound lag corrections. Under certain conditions the observer shifts to the binoculars 4', as explained above, in which case he continues to operate the scanning handle 42.

It should be observed that while the operator may discontinue the turning of the sound lag correction knobs 93 and 93', the correction then set into the machine remains so that even after the target is sighted and the operators are turning only the hand wheels 7 and 15, the sound locator remains pointed at the sound lag angle indicated with respect to the sight. This has the great advantage that in case the observer should lose the target and have to shift back to the sound locator, it would be pointed in approximately the right position to pick up the target and thus much time be saved.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a system of locating aircraft at night, a sound locator, a searchlight spaced therefrom, transmitting means at the former for controlling the latter, by the azimuth and elevation movements of the former, a sound lag corrector at the former, means for superimposing a systematic scanning movement to the searchlight beam, a pair of sighting devices at the former and turned therewith, one of which is of lesser angular field than the other, and means for imparting said scanning movement only to said sighting device of lesser angular field.

2. In a system of locating targets at night, nonoptical means for initially and approximately locating the target, a searchlight positioned thereby, means for superimposing a spiral scanning motion thereto, including means for maintaining the linear rate of said motion substantially uniform with the angular rate.

3. In a system of locating targets at night, nonoptical means for initially and approximately locating the target, means for positioning a searchlight therefrom in azimuth and elevation, means for superimposing a to and fro motion on both said azimuth and elevation components to cause the searchlight to search around the indicated position in a spiral, and means for correcting the azimuthal component in accordance with a function of the angle of elevation to maintain the axes of the spiral symmetrical.

4. In a system of locating aircraft at night, a sound locator, a searchlight spaced therefrom, a sight at said sound locator turned in azimuth and elevation thereby, transmitting means at the sound locator for controlling the searchlight by the azimuth and elevation movements of the sound locator, a sound lag corrector at the sound locator for correcting the sight position and also said angle before transmission, means at the sound locator for superimposing a systematic scanning movement to said transmitting means and sight, and means whereby both said sound lag correction and said scanning means are discontinued in operation when the target is observed through said sight, but the set in correction remains.

5. A nocturnal sound locating system for aircraft as claimed in claim 1, wherein the sound lag correction is imparted only to the sighting device of lesser angular field.

6. A target locating system particularly for locating aircraft at night, comprising a searchlight, a sound locator comprising a plurality of sound receivers, correction mechanism located in the base of the sound locator to compensate for sound lag and other errors, a sighting device for observing the searchlight beam also located at the sound locator, and control handles for rotating the sound locator in azimuth and elevation, arranged where they can be operated either by a listener through the sound locator or by an observer looking through the sighting device, the sound lag correction set in remaining to keep the sound locator pointed approximately at the correct angle to the sight.

7. A system of locating and following aircraft at night, as claimed in claim 6, having a mechanical device adapted to be operated by said observer for superimposing a scanning motion to the sighting device and transmitting means for causing the sighting device and searchlight to scan around the indicated position, the observer ceasing to operate said device at the time he assumes control of said main rotating means.

8. A sound locating system as claimed in claim 6, wherein said control handles operate the sound locator directly and the said sighting device through said correction mechanism when the sound locator is being used, whereby a change back to control by the sound locator is facilitated.

9. In an anti-aircraft sound locator-searchlight system, a sound locator, a remote searchlight controlled therefrom, transmission means for controlling the searchlight from said sound locator, a pair of sighting devices for spotting and following the target at said sound locator, one of which devices is of limited field and the other of wide field of vision, a common means for turning said sound locator, both sighting devices and said transmitting means, and a correcting means for displacing said sound locator from at least the limited field sight and transmitting means to correct for the sound lag error.

10. In an anti-aircraft sound locator-searchlight system, a sound locator, a remote searchlight controlled therefrom, transmission means for controlling the searchlight from said sound locator, a pair of sighting devices for spotting and following the target, one of which devices is of limited field and the other of wide field of vision, a common means for turning said sound locator, both sighting devices and said transmitting means, and an additional scanning means for imparting a limited scanning motion to said limited field sight and transmitting means only.

11. In a system of following a target at night, a sound locator, means adapted to be operated by one or more listeners for rotating the same in azimuth and elevation, a searchlight spaced therefrom, a sound lag corrector actuated by the searchlight movements, electrical transmitting means at the sound locator for controlling the searchlight by remote control by the azimuth and elevation movements of the former as corrected by said corrector, and a sighting device for an observer at the locator and turned in azimuth and elevation by the movements of the sound locator as corrected by said corrector, said first mentioned means being also adapted to be operated directly by said observer, whereby the observer may assume control of said first mentioned means when the target is sighted, and bearings electrically transmitted to the searchlight directly from the sight.

12. A system for locating an aircraft at night, including a searchlight for illuminating the target, a sound locator, a telescopic means, means for controlling the searchlight alternatively from either the sound locator or telescopic means, correction mechanism between the sound locator on the one hand and the telescopic means and searchlight on the other hand, and means operative both when the searchlight is controlled by the sound locator and when it is controlled by the telescopic means for keeping the sound locator directed toward the direction from which the sound is arriving when the telescope and searchlight are pointing at the target.

FRANK R. HOUSE.